United States Patent [19]

Tanaka

[11] Patent Number: 4,675,758
[45] Date of Patent: Jun. 23, 1987

[54] MAGNETIC DISC RECORDING AND/OR REPRODUCING APPARATUS

[75] Inventor: Yoshinori Tanaka, Isehara, Japan

[73] Assignee: Sony Corporation, Tokyo, Japan

[21] Appl. No.: 574,744

[22] Filed: Jan. 30, 1984

[30] Foreign Application Priority Data

Feb. 8, 1983 [JP] Japan .................................. 58-19198

[51] Int. Cl.⁴ ................................................ G11B 5/55
[52] U.S. Cl. ........................................ 360/75; 360/106
[58] Field of Search ...................... 360/75, 76, 78, 106

[56] References Cited

U.S. PATENT DOCUMENTS 4,367,505 1/1983 Stromsta et al. ..................... 360/121
4,514,772 4/1985 Cantwell ............................... 360/75

Primary Examiner—George G. Stellar
Attorney, Agent, or Firm—Hill, Van Santen, Steadman & Simpson

[57] ABSTRACT

A magnetic disc recording and reproducing apparatus for magnetic discs wherein the gap of the recording and reproducing head is mounted parallel and ahead of a radial through the disc so as to record and reproduce a track and a pair of erasing heads are integrally formed with said recording and reproducing head and have gaps which are parallel and behind the same radial through disc so as to erase the outer edges of the track. The gap of the recording and reproducing head is symmetrically mounted with the erasing head gaps.

3 Claims, 4 Drawing Figures

MAGNETIC DISC RECORDING AND/OR REPRODUCING APPARATUS

BACKGROUND OF THE INVENTION

1. Field of the Invention

The present invention relates to a magnetic disc recording and/or reproducing apparatus such as a floppy disc drive unit or the like.

2. Description of the Prior Art

In data recording and/or reproducing apparatus using a floppy disc or the like, high-precision parts or mechanisms are required as the track density is increased. The proportion of the track pitch error to the tracking error factor is one of the most important design factors. If the allowable error of the drive mechanism included in the overall tracking error is relatively large, the precision of the drive mechanism can be low and the overall apparatus can be less expensive. During the design stage, the factors which cause offtrack errors that may be caused during production and which theoretically arise must be completely eliminated.

When concentric tracks are formed on a disc, the track pitch error changes in accordance with the distance from the center of the disc along the radial direction. That is, since the radius of curvature increases toward the center of the disc the track pitch error increases toward the center of the disc. For this reason, the design is generally accomplished such that the tracking error remains within an allowable range so that the worst offtract at the innermost track during reproduction does not occur. However, in a so-called micro floppy disc having a diameter of 3.5 inches, for example, the track pitch error at the innermost track is very large. For this reason, high precision is required for the chucking mechanism for the disc and for the head drive mechanism which results in expensive apparatus.

SUMMARY OF THE INVENTION

The present invention has an object to provide a magnetic disc recording and/or reproducing apparatus which has a large offtrack margin, so that a head will not simultaneously overlap on two adjacent tracks even if the accuracy of positioning the disc and/or head is not high.

In order to achieve the above object of the present invention, there is provided a magnetic disc recording and/or reproducing apparatus wherein a recording/reproducing head and a tunnel erasing head are arranged along the rotating direction of a disc-shaped magnetic recording medium such that the recording/reproducing head is followed by the erasing head, and wherein the effective operative portions of the recording/reproducing head and the erasing head are arranged on two sides of a line A-A' which passes through the center of the disc. With this construction, high performance is obtained without very high precision of the drive mechanism being necessary.

DETAILED DESCRIPTION OF THE PREFERRED EMBODIMENTS

The preferred embodiment of the present invention will now be described in comparison with a conventional apparatus.

Figure 1:
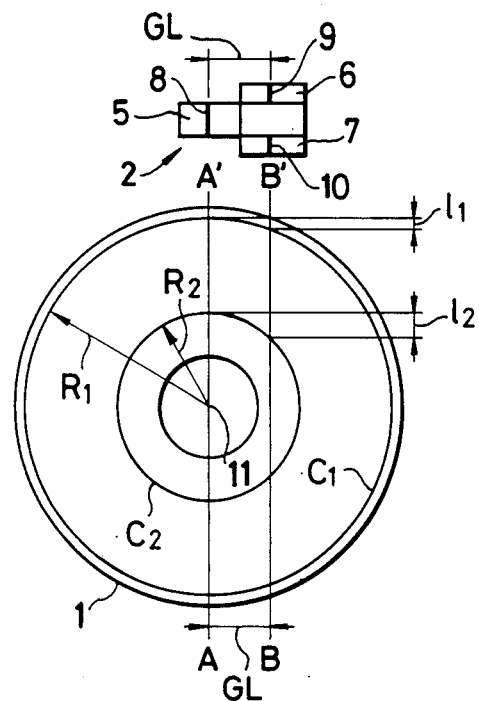
FIG. 1 is a schematic plan view showing a prior art conventional floppy disc and a conventional head assembly.
Figure 2:
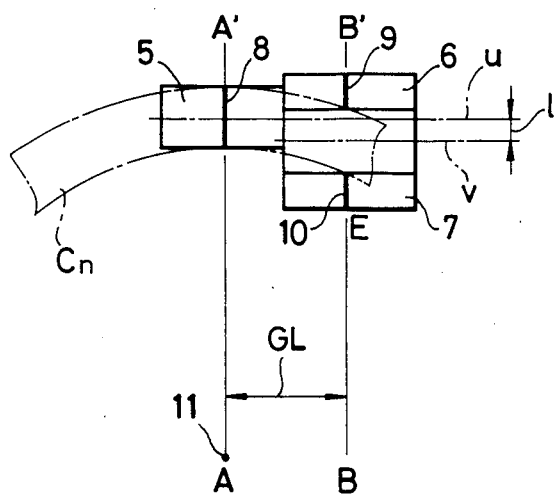
FIGS. 2 and 3 are enlarged partial, detailed plan views showing the track and head assembly shown in FIG. 1.
Figure 3:
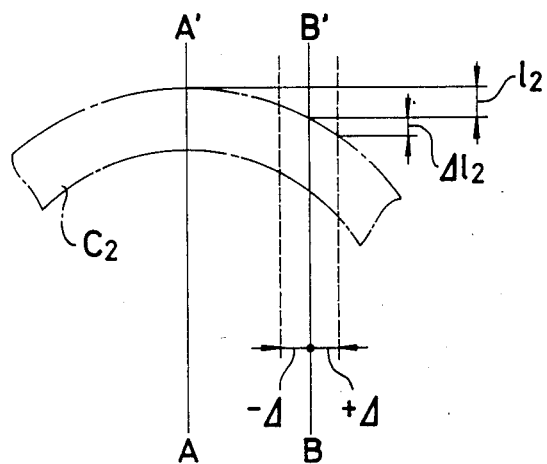

FIG. 1 is a schematic plan view of a conventional floppy disc and a head assembly, and FIGS. 2 and 3 are partial enlarged plan views of one track and the head assembly shown in FIG. 1.

Referring to FIG. 1, a floppy disc 1 consists of a resin film and a magnetic material coating formed on one or two surfaces of the resin film. A number of concentric tracks including an innermost track $C_2$ and an outermost track $C_l$ are formed on the floppy disc 1 and digital signals or the like are recorded thereon or reproduced therefrom by a head assembly 2 shown as enlarged above the disc 1. The head assembly 2 has a recording/reproducing head 5 and a pair of erasing heads 6 and 7 which follow the head 5 in the rotating direction of the disc 1.

As shown in FIG. 2, a gap 8 of the conventional recording/reproducing head 5 is on a line A-A' which passes through a center 11 of the disc 1. The entire head assembly 2 is moved along the line A-A'. Thus, the head step pitch and the track pitch are set to be substantially the same. Gaps 9 and 10 of the erasing heads 6 and 7 are located on two sides of the gap 8 of the recording/reproducing head 5 and extend generally in the radial direction of the disc 1. The erasing heads 6 and 7 perform tunnel erasing, and guard bands having a width equal to that of the erasing heads 6 and 7 are formed on two sides of each track.

When the horizontal distance relative to FIG. 2 between the gap 8 of the recording/reproducing head 5 and the gaps 9 and 10 of the erasing heads 6 and 7, respectively, is designated by GL (0.7 to 0.9 mm), the position of the erasing heads 6 and 7 will be offset in accordance with the radius of curvature of the track $C_n$. In order to eliminate such offset, as shown in FIG. 2, a line v which passes through the midpoint between the erasing heads 6 and 7 is offset by a distance l (offset amount) from a center line u of the recording/reproducing head 5. However, the misalignment of the erasing heads 6 and 7 from the track changes according to the radial position of the track $C_r$ and it has a minimum value $l_1$ at the outermost track $C_1$ and has a maximum value $l_2$ at the innermost track $C_2$. Accordingly, the misalignment $l_1$ to $l_2$ cannot be cancelled for all tracks with a fixed offset l. Accordingly, the gaps of the erasing heads will be offset which results in a track pitch error.

Since the track pitch on a line B-B' parallel to A—A and that on the line A-A' are different from each other, the total track pitch error $\Delta p = (l_2 - l_1)$ as shown in Table 1 below is generated:

TABLE 1

|  | Pitch Error | | |
| --- | --- | --- | --- |
|  | 8" | 5" | 3.5" |
| R1 (mm) | 89.6377 | 55.034 | 38.0 |
| R2 (mm) | 49.421 | 34.3965 | 23.1875 |
| $l_1$ (μm) | 3.6 | 5.8 | 8.4 |
| $l_2$ (μm) | 6.5 | 9.3 | 13.8 |
| $\Delta p$ (μm) | 2.9 | 3.5 | 5.4 |
| L (μm) | 88 | 88 | 31 |

TABLE 1-continued

| | Pitch Error | | |
|---|---|---|---|
| | 8" | 5" | 3.5" |
| r (%) | 3.2 | 4.0 | 17.4 |

R1 = the radius of the outermost track
R2 = the radius of the innermost track
$\Delta p = l_1 - l_1$: total track pitch error $L$ = the allowable limit of offtrack = ½ of the width of the erasing head (In the case wherein the width of the recording/reproducing head = ⅔ of the track pitch; the width of the erasing heads = ⅙ of the track pitch)

$r = (\Delta p/L) \times 100\%$

As shown in Table 1, the track pitch error $\Delta p$ is 2.9 μm for an 8" disc, 3.5 μm for a 5" disc, and 5.4 μm for a 3.5" disc (all with GL=0.8 mm). The pitch error of a 3.5" disc, 5.4 μm, is fairly large and is 17.4% of the allowable offtrack L (tracking error during reproduction). The 8" and 5" discs have small ratios of 3.2% and 4.0%, respectively, of the pitch error to the allowable offtrack L. The allowable offtrack L is the allowable dislocation of a head from a track during reproduction. When the width of the recording/reproducing head is ⅔ of the track pitch and the width of the erasing heads is ⅙ of the track pitch, ½ of the width of the erasing heads (guard band width) is defined as the allowable offtrack L. When the offset of the head from the track during reproduction exceeds the allowable offtrack L, the head may overlap the adjacent track in the worst condition which increases reading errors. The worst condition is a case where the track is formed by a recording unit so as to have a dislocation of $-L$, and the head of a reproducing unit is mechanically displaced by $+L$ from the reference position.

When the offset amount $l$ between the recording/reproducing head 5 and the erasing heads 6 and 7 are set on a track intermediate between the outermost track $C_l$ and the innermost track $C_l$, a track pitch error $p/2$ which is ½ of the track pitch error is caused in both the inward and outward directions. Since the drive mechanism has a head positioning error ($\pm \Delta$ in FIG. 3) of about $\pm 50$ μm in the tangential direction of the track, a further track error of $\Delta l_2$ is caused. Therefore, the innermost track (or the outermost track) has a maximum offtrack of $\Delta p/2 + \Delta l_2$. In the case of a 3.5" disc, the value of $\Delta p/2 + \Delta l_2$ is 4.4 μm as shown in Table 2, which is 14.2% of the allowable offtrack or tracking error L (31 μm). The 8" and 5" discs have values of $\Delta p/2 + \Delta l_2$ of 2.6% and 2.96%, respectively.

TABLE 2

| | Pitch Error | | |
|---|---|---|---|
| | 8" | 5" | 3.5" |
| $l_1$ (μm) | 3.6 | 5.8 | 8.4 |
| $l_2$ (μm) | 6.5 | 9.3 | 13.8 |
| $\Delta l_2$ (μm) | 0.82 | 1.21 | 1.7 |
| $\Delta p$ (μm) | 2.9 | 3.5 | 5.4 |
| $\Delta p/2 + \Delta l_2$ (μm) | 2.27 | 2.96 | 4.4 |
| L (μm) | 88 | 88 | 31 |

TABLE 2-continued

| | Pitch Error | | |
|---|---|---|---|
| | 8" | 5" | 3.5" |
| r (%) | 2.6 | 2.96 | 14.2 |

With a conventional floppy disc recording and/or reproducing apparatus, the track pitch error becomes considerably larger for a 3.5" disc. Accordingly, the chucking mechanism of the disc or the head drive mechanism must have high precision.

Figure 4:
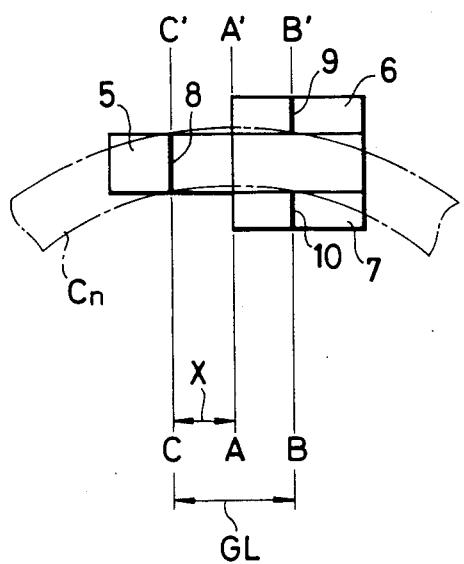
FIG. 4 is a partial plan view showing an arrangement of a recording/reproducing head and erasing heads according to the present invention.

FIG. 4 is a partial enlarged view showing a track and a head assembly according to an embodiment of the present invention, which is a similar view to that shown in FIG. 2.

As shown in FIG. 4, the gap 8 which is an effective operative portion of a recording/reproducing head 5 is arranged on a line C-C" in this embodiment. The line C-C" is parallel to line A-A' and is shifted from line A-A' which passes through the center of the disc by a distance x in a direction which is opposite to the direction which the erasing heads 6 and 7 are shifted. A distance GL between the gap 8 of the recording/reproducing head 5 and gaps 9 and 10 of the erasing heads 6 and 7, respectively, must be 0.7 mm or less for an 8" or 5" standard format.

When the distance x between the line A-A' and the recording/reproducing head gap 8 is 0.35 mm and the gap distance GL between the gap 8 of the recording/reproducing head 5 and the gaps 9 and 10 of the erasing heads 6 and 7, respectively, is 0.7 mm, the recording/reproducing head 5 and the erasing heads 6 and 7 are arranged symmetrical about the line A-A'. Accordingly, the erasing heads 6 and 7 need not be offset from the recording/reproducing head 5 as is required in the prior art structures.

Table 3 below shows the changes in the track pitch error when the distance x between the disc central line A-A' and the gap 8 of the recording/reproducing head 5 is changed.

TABLE 3

| | Pitch Error | | | |
|---|---|---|---|---|
| x (mm) | 0.7 | 0.8 | 0.9 | 0.35 |
| $l_1$ (μm) | 6.45 | 8.4 | 10.66 | 1.62 |
| $l_2$ (μm) | 10.57 | 13.8 | 17.474 | 2.64 |
| $\Delta l_2$ (μm) | 1.56 | 1.7 | 1.996 | 0.81 |
| $\Delta p$ (μm) | 4.12 | 5.4 | 6.8 | 1.02 |
| $\Delta p/2 + \Delta l_2$ (μm) | 3.62 | 4.4 | 5.4 | 1.32 |
| L (μm) | 31 | 31 | 31 | 31 |
| r (%) | 11.7 | 17.4 | 17.4 | 4.24 |

As shown in Table 3, when x=0.35 mm, the total pitch error $\Delta P$ at the line C-C' is 1.02 μm. This value is the pitch error with respect to the recording/reproducing head gap 8. The pitch error for the erasing head gaps is smaller than 1.02 μm for GL in the range of 0 to 0.7 mm. The value of the offtrack $\Delta p/2 + \Delta l_2$ of the recording/reproducing head 5 is 1.32 μm. This value is 4.24% of the allowable tracking error L (31μm) and is very small. Accordingly, the requirement of precision for the disc and head drive mechanism is not so great as in the prior art structures. The tracking error of the erasing heads 6 and 7 will not exceed 1.32 μm for GL in the range of 0 to 0.7 mm.

When the head arrangement of a 5" or 8" disc wherein the gap distance GL is 0.9 mm (0.7 to 0.9 mm) is applied to a 3.5" disc and x=0.9 mm (x in this case is the distance between the line A-A' and the erasing head gap) as shown in FIG. 3, the tracking error of the erasing heads reaches 5.4 μm. This is 17.4% of the allowable tracking error L, and the mechanical tracking error allowed for the disc and the head drive mechanism is reduced from 31 μm to 25.4 μm. That is, a higher precision is required.

When the head arrangement as shown in FIG. 4 is adopted, the tracking error margin is increased, and satisfactory recording and/or reproducing performance may be obtained without requiring a high degree of precision in the drive mechanism. In the embodiment shown in FIG. 4, the gap 8 of the recording/reproducing head 5 and the gaps 9 and 10 of the erasing heads 6 and 7, respectively, are arranged symmetrically about the center line A-A'. However, the present invention is not limited to this particular arrangement. The effect of the present invention may be obtained with an asymmetrical gap arrangement with respect to the center line A-A'. Note that the present invention is similarly applicable to a straddle erase system which uses a DC erasing head (permanent magnet head) and which does not have a gap.

In summary, according to the present invention, since the recording/reproducing head and the erasing heads are arranged on two sides of a radial line passing through the center of the disc, the track pitch error can be reduced to a minimum. In addition, the ratio of the track pitch error to the allowable offtrack (tracking error) between the head and a track becomes small, so that less precision is required for parts of the chucking mechanism of the disc and the head drive mechanism.

Although the invention has been described with respect to preferred embodiments, it is not to be so limited as changes and modifications can be made which are within the full intended scope of the invention as defined by the appended claims.

I claim as my invention:

1. A magnetic disc recording and/or reproducing apparatus for recording and reproducing signals on a rotating magnetic disc wherein the track pitch error is minimized and the tracking error margin is increased and satisfactory recording and reproducing performance may be obtained without requiring a high degree of precision in the drive mechanism comprising means for reading and writing information on a disc, said means comprising a recording/reproducing head for recording and reproducing a track mounted so as tomove over said rotating magnetic disc and to be transported in the radial direction of said disc and having a gap which is offset a fixed distance in a first direction and parallel to a radial line through said disc, and an erasing head connected to said recording/reproducing head mounted so as to move over said rotating magnetic disc and to be transported in the radial direction of said disc and having two gaps which are aligned on the opposite outer edges of said track and which are offset a fixed distance and in a second direction and parallel to said radial line through said disc, and wherein said two gaps of said erasing head are symmetrically arranged relative to the gap of said recording/reproducing head on opposite sides of said track and are equally spaced from said radial line through said disc whereby the track pitch error is reduced to a minimum.

2. A magnetic disc recording and/or reproducing apparatus for recording and reproducing signals on a rotating magnetic disc wherein the track pitch error is minimized and the tracking error margin is increased and satisfactory recording and reproducing performance may be obtained without requiring a high degree of precision in the drive mechanism, comprising means for reading and writing information on a disc and said means comprising a recording/reproducing head for recording and reproducing a track mounted so as to move over said rotating magnetic disc and to be transported in the radial direction of said disc and having a gap which is offset a fixed distance in a first direction and parallel to a radial line through said disc, and an erasing head connected to said recording/reproducing head mounted so as to move over said rotating magnetic disc and to be transported in the radial direction of said disc and having two gaps which are aligned on the opposite outer edges of said track and which are offset a fixed distance and in a second direction and parallel to said radial line through said disc so that the two gaps of said erasing head have a different azimuth angle from the gap of said recording/reproducing head whereby the track pitch error is reduced to a minimum.

3. A magnetic disc recording and/or reproducing apparatus for recording and reproducing signals on a rotating magnetic disc according to claim 2 wherein said two gaps of said erasing head are symmetrically arranged relative to the gap of said recording/reproducing head on opposite sides of said track.

* * * * *